(12) United States Patent
Fujihara (10) Patent No.: US 9,551,395 B2
(45) Date of Patent: Jan. 24, 2017

(54) SHOCK ABSORBER (71) Applicant: Koganei Corporation, Koganei-shi, Tokyo (JP)

(72) Inventor: Shunsuke Fujihara, Koganei (JP)

(73) Assignee: Koganei Corporation, Tokyo (JP)

( * ) Notice: Subject to any disclaimer, the term of this patent is extended or adjusted under 35 U.S.C. 154(b) by 0 days.

(21) Appl. No.: 14/739,527

(22) Filed: Jun. 15, 2015

(65) Prior Publication Data
US 2015/0362040 A1 Dec. 17, 2015

(30) Foreign Application Priority Data

Jun. 17, 2014 (JP) .................................. 2014-124272

(51) Int. Cl.
*F16F 13/00* (2006.01)
*F16F 9/44* (2006.01)

(52) U.S. Cl.
CPC ............... *F16F 13/007* (2013.01); *F16F 9/44* (2013.01); *F16F 2228/066* (2013.01)

(58) Field of Classification Search
CPC .................. F16F 3/10; F16F 9/34; F16F 9/44; F16F 9/48; F16F 9/52; F16F 9/145; F16F 9/346; F16F 9/466; F16F 13/007; F16F 13/08; F16F 13/10; F16F 13/24; F16F 13/105
USPC ...................... 267/140.11; 188/287, 299, 315
See application file for complete search history.

(56) References Cited

U.S. PATENT DOCUMENTS

| 2,846,029 | A | * | 8/1958 | Cawley | ..................... F16F 9/44 188/287 |
| 3,201,110 | A | * | 8/1965 | Taccone | ..................... F16F 9/44 188/285 |
| 3,889,934 | A | * | 6/1975 | Kamman | ..................... F16F 9/48 188/287 |
| 4,059,175 | A | | 11/1977 | Dressell, Jr. et al. | |

(Continued)

FOREIGN PATENT DOCUMENTS

| EP | 1293702 A2 | 3/2003 |
| EP | 2017494 A2 | 1/2009 |

(Continued)

OTHER PUBLICATIONS

English machined translation of EP-2017494. (Description only).*
European Search Report for Appln. No. EP15172128.9, dated Oct. 20, 2015.

*Primary Examiner* — Robert A Siconolfi
*Assistant Examiner* — San Aung
(74) *Attorney, Agent, or Firm* — McCormick, Paulding & Huber LLP (57) ABSTRACT

An object of the present invention is to reduce the size of a shock absorber, and to facilitate adjusting of the damping amount of the shock absorber. The shock absorber 10 has an outer tube 11 and an inner tube 15, wherein a piston rod 14 projects from a base end of the outer tube 11, and a rotative operating part 19 provided in the inner tube 15 projects from a base end of the outer tube 11. An annular piston 27 separates a liquid accommodating chamber 16 into a shock absorbing chamber 28 and an accumulator chamber 29. A flow-rate adjusting hole 48 of the outer tube 11 is composed of a contact surface 51 and an eccentric surface 52. A bypass channel 53 communicating with a communication hole 49 is formed between the eccentric surface 52 and the inner tube 15.

6 Claims, 4 Drawing Sheets (56) References Cited

U.S. PATENT DOCUMENTS

| | | | |
|---|---|---|---|
| 5,050,712 A * | 9/1991 | Heideman | F16F 9/516 |
| | | | 188/287 |
| 5,598,904 A * | 2/1997 | Spyche, Jr. | F16F 9/34 |
| | | | 188/287 |
| 2004/0094376 A1* | 5/2004 | van Wonderen | F16F 9/346 |
| | | | 188/285 |
| 2009/0001636 A1* | 1/2009 | Miyasato | F16F 9/346 |
| | | | 267/64.13 |

FOREIGN PATENT DOCUMENTS

| JP | S5438270 A | 3/1979 |
|---|---|---|
| JP | 59147132 A | 8/1984 |
| JP | S6166235 | 5/1986 |
| JP | H0628377 | 4/1994 |

\* cited by examiner

SHOCK ABSORBER

CROSS-REFERENCE TO RELATED APPLICATION

The present application claims priority from Japanese Patent Application No. 2014-124272 filed on Jun. 16 2014, the content of which is hereby incorporated by reference into this application.

TECHNICAL FIELD OF THE INVENTION

The present invention relates to a shock absorber which damps the kinetic energy of a moving member.

BACKGROUND OF THE INVENTION

When a moving member is stopped at a predetermined position, a buffer, in other words, a shock absorber is used for damping the kinetic energy of the moving member, and for reducing an impact force applied to the moving member. As one example, the shock absorber may have a double tube structure having an outer tube and an inner tube.

In a shock absorber of this type, a liquid accommodating chamber is provided in the inner tube, and liquid is injected into the liquid accommodating chamber. The liquid accommodating chamber is communicated with the space between the inner tube and the outer tube via communication holes provided in the inner tube. A piston is provided at a base end of a piston rod, and movable in the axial direction in the liquid accommodating chamber. When an impact force is applied to the piston rod from the moving member, and the piston is moved by the impact force so as to discharge liquid to the outside of the liquid accommodating chamber via the communication holes, the piston receives a flow resistance from the liquid, and the kinetic energy of the moving member is damped by the flow resistance. The damping amount is adjusted by changing the open degree of the communication holes so as to change the flow resistance of the liquid flowing through the communication holes.

Japanese Patent Publication No. S54-38270 discloses a hydraulic buffer having a cylinder, in other words, an inner tube in which a piston rod is built, and having a case body, in other words, an outer tube rotatably mounted on the outside face of the cylinder. An adjusting ring and an accumulator are attached to the case body, and the adjusting ring and the accumulator are disposed in a liquid chamber formed in a cylindrical shape between the cylinder and the case body. An orifice, in other words, the distance between the communication holes and the adjusting ring is changed by rotation of the adjusting ring so that the flow resistance of the liquid is changed.

Japanese Utility Model Publication No. S61-66235 discloses a buffer in which an inner cylinder and a floating piston are coaxial with and built in a cylinder. The inner cylinder is rotatably built in the cylinder, a projecting end thereof is projecting from a first end of the cylinder, and a piston rod is projecting from the projecting end of the inner cylinder. A fluid chamber formed between the inner cylinder and the floating piston is communicated with a liquid accommodating chamber in the inner cylinder through through-holes, and an eccentric V-shaped groove communicated with the through-holes are provided on the inner surface of the cylinder.

Japanese Utility Model Publication No. H06-28377 discloses a fluid-pressure buffer device having a metering tube and a pressure tube which is rotatably built in the metering tube. An eccentric groove is formed on the outer surface of the pressure tube, holes opened to the eccentric groove are formed in the pressure tube, and an orifice is provided on the metering tube. Therefore, the liquid in the pressure tube is flowed to the outside of the metering tube via the holes, the eccentric groove, and the orifice.

As described in Japanese Patent Publication No. S54-38270, in the hydraulic buffer configured so that the liquid chamber is formed in the cylindrical shape between the cylinder and the case body and that the adjusting ring and the accumulator are disposed in the liquid chamber, the outer diameter of the case body is large, and the buffer cannot be reduced in size. Moreover, in the structure in which the adjusting ring is configured to be attached to the case body by a ball-stop screw, attachment strength between the adjusting ring and the case body cannot be increased in a small buffer, and it is difficult to apply this to a small buffer.

As described in Japanese Utility Model Publication No. S61-66235, in a case where the inner cylinder and the floating piston are built in the cylinder, the buffer cannot be reduced in size. Moreover, the projecting end of the inner cylinder, which adjusts an aperture degree, has to be provided in the same side as the projecting end of the piston rod. More specifically, since an adjusting mechanism of the aperture degree is in the side in which a workpiece collides with the piston rod, the damping amount cannot be easily adjusted.

Furthermore, as described in Japanese Utility Model Publication No. H06-28377, in a case where the orifice is provided on the outside metering tube, a tube has to be further provided in the outside of the metering tube. Therefore, the buffer cannot be reduced in size.

SUMMARY OF THE INVENTION

It is an object of the present invention to provide a shock absorber improved in size.

It is another object of the present invention to facilitate adjusting of the damping amount of the shock absorber.

A shock absorber according to one aspect of the present invention, comprises: an outer tube on which a piston rod is mounted, and in which the piston rod is reciprocable in an axial direction, the piston rod having a projecting end projecting from a distal end of the outer tube; an inner tube rotatably mounted in the outer tube, the inner tube and the outer tube collectively forming a liquid accommodating chamber to which liquid is injected; a rotative operating part provided at the inner tube, the rotative operating part projecting from a base end of the outer tube; a spring member disposed in a shock absorbing chamber, the spring member applying a spring force to the piston rod in a projecting direction of the piston rod; at least one communication hole provided so as to penetrate through the inner tube in a radial direction; and a flow-rate adjusting hole consisting of a contact surface being in contact with an outer peripheral surface of the inner tube and an eccentric surface being eccentric in the radial direction with respect to a rotation central axis of the inner tube and forming, together with an outer peripheral surface of the inner tube, a bypass channel communicated with the communication hole, the flow-rate adjusting hole provided on an inner peripheral surface of the outer tube; wherein a communication opening degree of the bypass channel and the communication hole is configured to be changed by rotating the inner tube.

This shock absorber has a double tube structure having the inner tube and the outer tube, wherein the projecting end of the piston rod projects from the distal end of the shock absorber, and impact force is applied to the piston rod from the outside. The shock absorbing chamber and the accumulator chamber are provided to be adjacent to each other in the axial direction. Therefore, the shock absorber can be reduced in size without being increased in outer diameter of the shock absorber.

The outer tube has: the contact surface which is in contact with the outer peripheral surface of the inner tube; and the eccentric surface which forms the bypass channel together with the outer peripheral surface of the inner tube. The communication holes provided in the inner tube communicate the liquid between the shock absorbing chamber and the accumulator chamber via the bypass channel. When the damping amount of the impact force is to be adjusted by changing the flow resistance of the liquid flowing through the communication holes, the inner tube is rotated. In this process, the inner tube is rotated by the rotative operating part, which is projecting from the base end side of the outer tube; therefore, the damping amount can be adjusted while an operator actuates the shock absorber several times.

DESCRIPTION OF THE PREFERRED EMBODIMENTS

Figure 1:
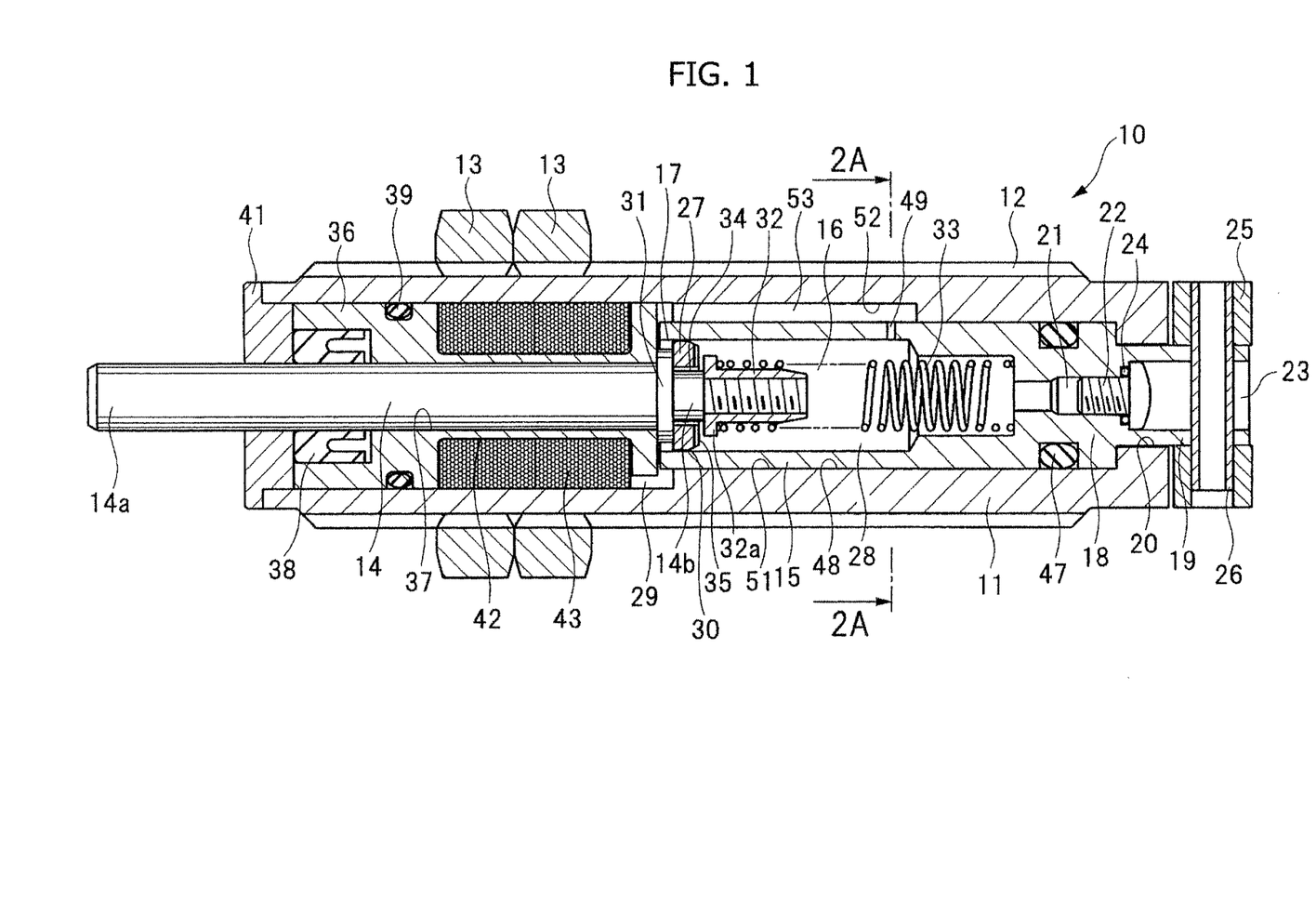
FIG. 1 is a vertical cross-sectional view of a shock absorber according to one embodiment.

Hereinafter, an embodiment of the present invention will be explained in detail with reference to the drawings. As shown in FIG. 1, a shock absorber 10 has an "outside tube", in other words, an outer tube 11. A male screw 12 is formed on an outer peripheral surface of the outer tube 11, and a nut 13 is screw-coupled to the male screw 12. The outer tube 11 is fastened to a member (not shown) with the nut 13.

A piston rod 14 is mounted on the outer tube 11 and reciprocable in an axial direction. The piston rod 14 has a projecting end 14a projecting from a distal end of the outer tube 11. An inner tube 15 is rotatably mounted in the outer tube 11. In this manner, the shock absorber 10 has the dual-structured "inner/outer" tubes.

A liquid accommodating chamber 16 is provided across the interior of the inner tube 15 and the space between the inner tube 15 and the outer tube 11. A closing part 18 is provided in a base end side of the inner tube 15, and a rotative operating part 19 having a cylindrical shape is provided at the closing part 18. The rotative operating part 19 extends through a through hole 20 provided at a base end of the outer tube 11, and projects outward in the axial direction.

In the specification, the piston rod 14 projects from one end of the outer tube 11, and this end serves as "distal end". The other end in the opposite side of the outer tube 11 serves as "base end". Similarly, the projecting end 14a of the piston rod 14 serves as "distal end", and the other end in the opposite side of the piston rod 14 serves as "base end" 14b.

In order to fill the shock absorber 10 with liquid, a liquid injecting hole 21 is provided in the closing part 18, and the liquid injecting hole 21 is opened to the base-end-side bottom surface of the liquid accommodating chamber 16. A stop screw 22 is screwed together, in other words, screw-fastened with the liquid injecting hole 21. When the stop screw 22 is to be screw-fastened with the liquid injecting hole 21, the stop screw 22 is inserted from a mounting hole 23 provided in the rotative operating part 19. After liquid is injected into the shock absorber 10, the liquid injecting hole 21 is closed by the stop screw 22. In order to seal the liquid injecting hole 21, a seal member 24 is mounted at the stop screw 22. An annular adjusting knob 25 is attached to the rotative operating part 19. In order to attach the adjusting knob 25 to the rotative operating part 19, a hollow pin 26 is attached to the adjusting knob 25, and the hollow pin 26 extends through the rotative operating part 19. An operator rotates the adjusting knob 25 and adjusts the inner tube 15. In order to fix the inner tube 15 and prevent the rotation of the inner tube 15, a fixing screw member (not shown) is provided at the adjusting knob 25.

An annular piston 27 is provided at the base end 14b of the piston rod 14. The annular piston 27 is disposed in the inner tube 15. The liquid accommodating chamber 16 is separated into a shock absorbing chamber 28 in the base end side of the inner tube 15 and an accumulator chamber 29 in the opposite side. A gap 30 is provided between the outer peripheral surface of the annular piston 27 and the inner peripheral surface of the inner tube 15. A flange 31 is provided at the base end of the piston rod 14, and a spring receiving member 32 is attached to the base end of the piston rod 14. The annular piston 27 is provided at the base end 14b disposed between a flange part 32a of the spring receiving member 32 and the flange 31, and the annular piston 27 is movable in the axial direction. In order to apply a projecting-direction spring force to the piston rod 14, a spring member, in other words, a compression coil spring 33 is disposed in the liquid accommodating chamber 16. One end of the compression coil spring 33 abuts on the spring receiving member 32, and the other end of the compression coil spring 33 abuts on the closing part 18.

A gap 34 is provided between the inner peripheral surface of the annular piston 27 and the outer peripheral surface of the piston rod 14. The gap 34 is larger than the gap 30. A plurality of grooves 35 opposed to the spring receiving member 32 are provided on the end face of the annular piston 27. When a moving member (not shown) collides with the piston rod 14 and moves the piston rod 14 backward, the annular piston 27 abuts on the flange 31, and the communication between the gap 34 and the accumulator chamber 29 is interrupted. Therefore, the liquid flows to the accumulator chamber 29 from the shock absorbing chamber 28 via the gap 30 between the annular piston 27 and the inner peripheral surface of the inner tube 15. On the other hand, when the piston rod 14 is moved to be projected by the spring force of the compression coil spring 33, the annular piston 27 abuts on the flange part 32a of the spring receiving member 32. Therefore, the liquid flows from the accumulator chamber 29 to the shock absorbing chamber 28 via not only the gap 30 between the annular piston 27 and the inner peripheral surface of the inner tube 15, but also a flow channel composed of the gap 34 and the grooves 35. As a result, when the piston rod 14 is moved to be projected, the flow resistance of the liquid becomes small compared with that upon a backward movement, and the projecting movement of the piston rod is quickly carried out. In this manner, the annular piston 27 functions as a check valve, and the flow resistance applied to the piston rod 14 is large upon the backward movement of the piston rod 14 and is small upon the projecting movement of the piston rod.

A rod cover 36 is mounted at the distal end of the outer tube 11. A through hole 37 is provided in the rod cover 36, and the piston rod 14 is penetrating through the through hole 37 and projecting from the distal end of the outer tube 11 to the outer side. A seal member 38 is provided at an inner peripheral groove of the rod cover 36, and the seal member 38 seals the part between the piston rod 14 and the rod cover 36. A seal member 39 is provided at an outer peripheral groove of the rod cover 36, and the seal member 39 seals the part between the rod cover 36 and the outer tube 11. An end plate 41 is mounted at the distal end of the outer tube 11, the end plate 41 abuts on the rod cover 36, and the end plate 41 fixes the rod cover 36 to the outer tube 11.

A housing groove 42 having a cylindrical shape is provided at an outer peripheral part of the rod cover 36, and the housing groove 42 is communicated to the accumulator chamber 29 in the side of an opening 17 of the inner tube 15. An accumulator member 43 having a cylindrical shape is mounted at the housing groove 42. The accumulator member 43 is formed of, for example, closed-pore sponge. Upon the backward movement of the piston rod 14, the liquid which flows from the shock absorbing chamber 28 into the accumulator chamber 29 so as to contract the accumulator member 43. On the other hand, upon projecting movement of the piston rod 14, the accumulator member 43 is restored, and the liquid is supplied from the accumulator chamber 29 to the shock absorbing chamber 28.

In this manner, the accumulator member 43 is provided at the rod cover 36 which guides the piston rod 14 in the axial direction. Since the accumulator member 43 is contracted and restored at such a position, the shock absorber 10 can be reduced in size without being increased in outer diameter of the shock absorber 10.

Figure 3A:
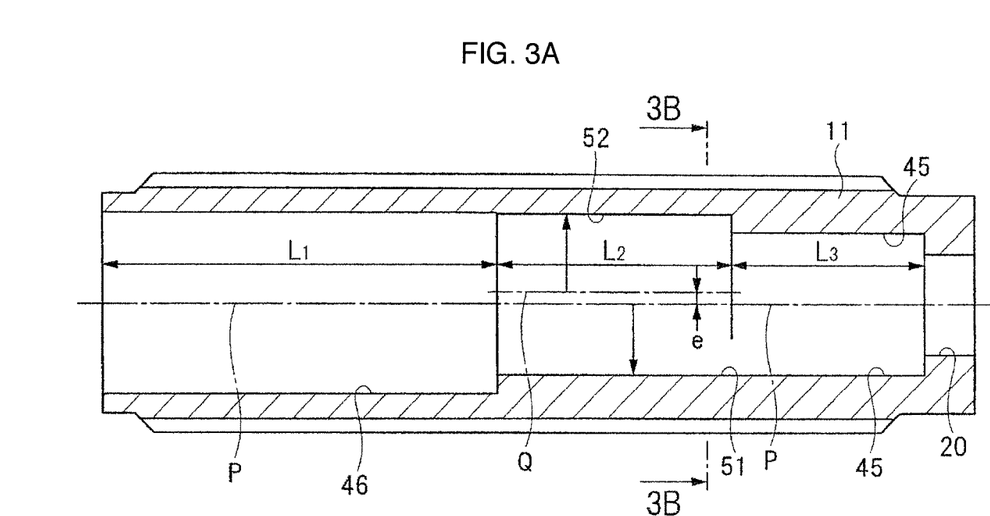
FIG. 3A is a vertical cross-sectional view showing an outer tube.
Figure 3B:
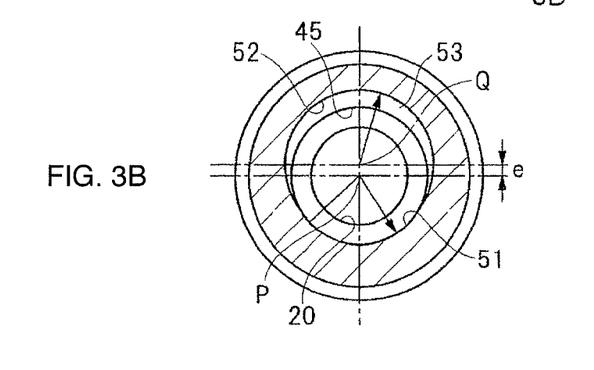
FIG. 3B is a 3B-3B-line cross-sectional view of FIG. 3A.

As shown in FIGS. 3A and 3B, a first fitting hole 45 is provided in the base end of the outer tube 11. The central axis of the first fitting hole 45 is coaxial with the rotation central axis "P" of the inner tube 15. Therefore, the base end of the inner tube 15 is rotatably supported by the fitting hole 45. A second fitting hole 46 is provided in the distal end of the outer tube 11, and the rod cover 36 is fixed to the second fitting hole 46. The central axis of the second fitting hole 46 is also coaxial with the rotation central axis "P". The entire inner peripheral surface of the first fitting hole 45 contacts the outer peripheral surface of the base end of the inner tube 15 and rotatably supports the inner tube 15. In this manner, by virtue of the machining operation of the fitting hole, the inner tube 15 can be smoothly rotated while maintaining the center of an axis.

As shown in FIG. 1, a seal member 47 is mounted at an annular groove provided on the outer peripheral surface of the closing part 18 of the inner tube 15, and the seal member 47 seals the part between the inner tube 15 and the fitting hole 45.

A flow-rate adjusting hole 48 is positioned between both of the fitting holes 45 and 46 and is provided in the outer tube 11. The length of the first fitting hole 45 is L3, the length of the flow-rate adjusting hole 48 is L2, and the length of the second fitting hole 46 is L1. As shown in FIG. 1, communication holes 49 are provided so as to penetrate through the inner tube 15 in a radial direction. In the flow-rate adjusting hole 48, the communication holes 49 are provided at the positions close to the side of the first fitting hole 45 in the axial direction.

An axial-direction one end of the flow-rate adjusting hole 48 is continued to the first fitting hole 45, and the other end of the flow-rate adjusting hole 48 is continued to the second fitting hole 46. As shown in FIGS. 2A to 2C, 3A and 3B, the flow-rate adjusting hole 48 consists of a contact surface 51 and an eccentric surface 52, and the contact surface 51 contacts the outer peripheral surface of the inner tube 15. An eccentric central axis "Q" deviates from the rotation central axis "P" of the first fitting hole 45 and the second fitting hole 46 by an eccentric quantity "e", and the eccentric surface 52 is a circular-arc surface having a center of the eccentric central axis "Q". A bypass channel 53 is formed between the eccentric surface 52 and the outer peripheral surface of the inner tube 15. The bypass channel 53 is communicated with the communication holes 49. When the piston rod 14 is moved in the axial direction, the liquid flows between the shock absorbing chamber 28 and the accumulator chamber 29 via the bypass channel 53. As shown in FIG. 3B, the bypass channel 53 reaches the maximum thickness at a circumferential-direction center part of the eccentric surface 52, and the bypass channel 53 is gradually reduced in thickness with departures in the circumferential direction from the center part toward both-side parts.

Figure 2A:
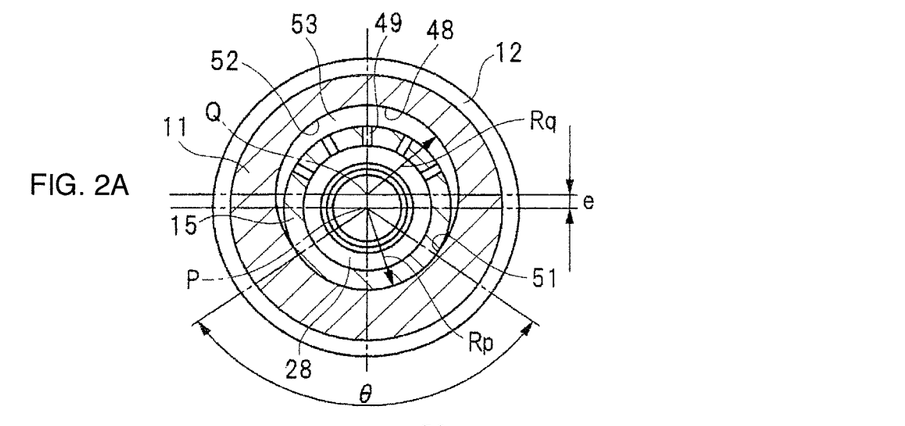
FIG. 2A is a 2A-2A-line cross-sectional view of FIG. 1.
Figure 2B:
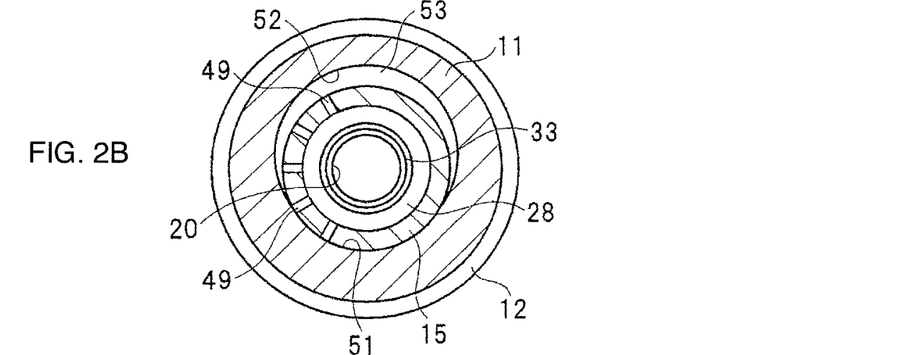
FIG. 2B is a 2A-2A-line cross-sectional view in a state in which an inner tube is rotated by 90 degrees from FIG. 2A.
Figure 2C:
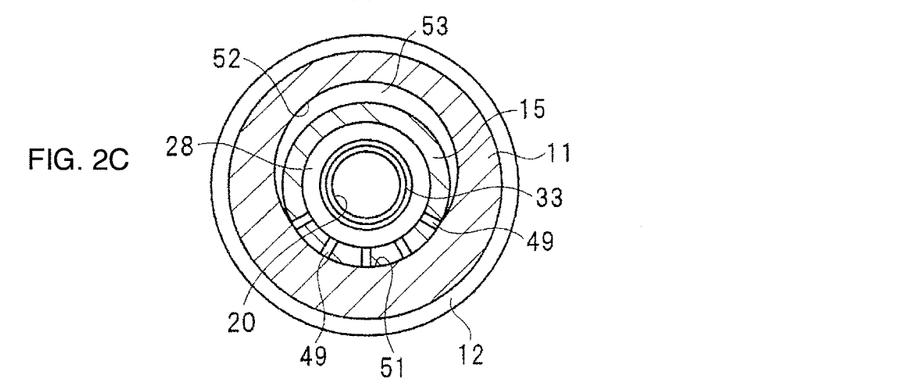
FIG. 2C is a 2A-2A-line cross-sectional view in a state in which the inner tube is rotated by 180 degrees from FIG. 2A.

As shown in FIGS. 2A to 2C, the five communication holes 49 are provided so as to be mutually shifted in the circumferential direction. The five communication holes 49 are provided in the circumferential direction while using the rotation central axis "P" as the center thereof. The number of the communication holes 49 is not limited to five and may be one or any of plural numbers of two or more, but is preferred to be plural. When the plurality of communication holes 49 are provided so as to be mutually shifted in the circumferential direction, the flow resistance of the liquid which flows through the communication holes 49 can be adjusted in a wide range.

The radius of the contact surface 51 is slightly larger than the rotation radius Rp of the outer peripheral surface of the inner tube 15. On the other hand, the radius Rq of the eccentric surface 52 is set to be larger than the rotation radius Rp. The eccentric quantity "e" is set to be larger than the radius difference $\Delta R = Rq - Rp$. In other words, $e > \Delta R$.

In this manner, when the eccentric quantity "e" is set to be larger than the radius difference $\Delta R$, the contact surface 51 is formed on the inner peripheral surface of the outer tube 11 and contacts the outer peripheral surface of the inner tube 15.

Figure 4A:
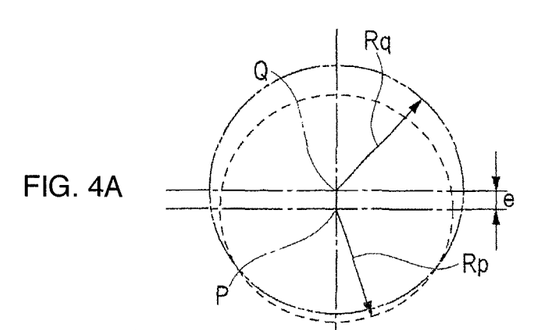
FIG. 4A is a schematic view showing the radius of the outer peripheral surface of the inner tube from a rotation center and the radius of an eccentric surface of the outer tube.

FIG. 4A is a schematic view showing the relation between the rotation radius Rp of the inner tube 15 and the radius Rq of the eccentric surface 52 of the outer tube 11; wherein, the circle of the rotation radius Rp is shown by a broken line, and the circle of the radius Rq is shown by two-dot chain line. When the eccentric quantity "e" is larger than the radius difference $\Delta R$, the circle of the rotation radius Rp is shifted to the outer side than the circle of the radius Rq.

Figures 4B, 4C, 4D:
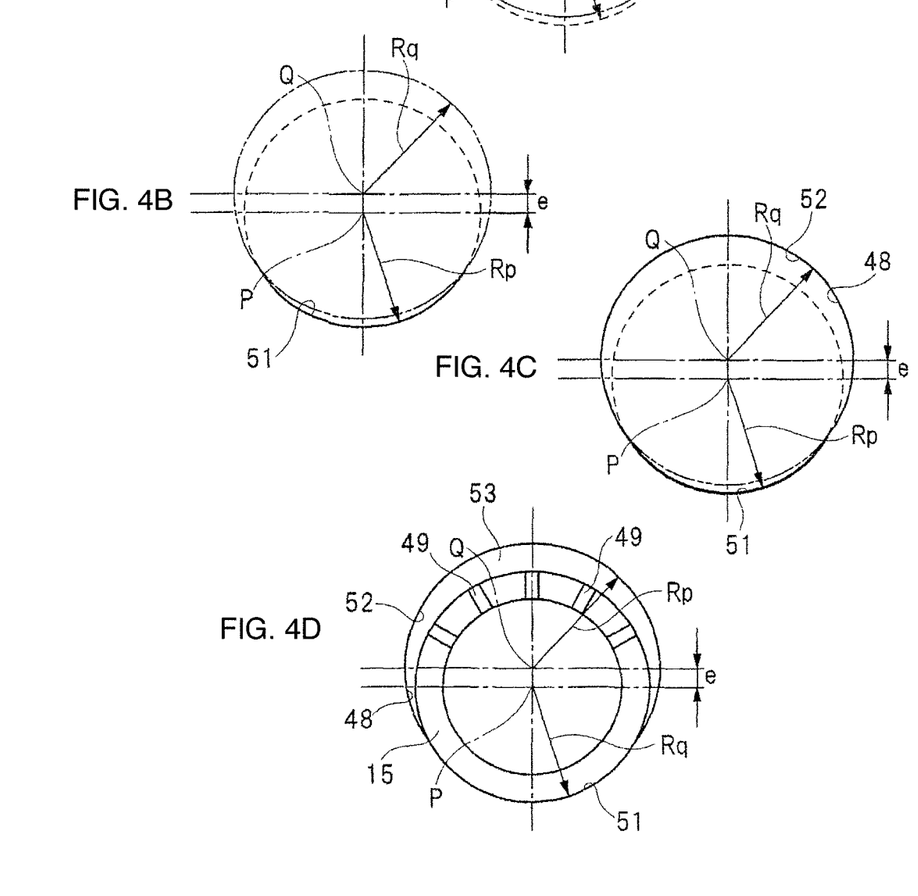
FIG. 4B is a schematic view showing, by a solid line, a contact surface formed on the outer tube.
FIG. 4C a schematic view showing, by a solid line, the contact surface and the eccentric surface formed on the outer tube.
FIG. 4D is a schematic view showing the relation between the inner tube and a flow-rate adjusting hole which consists of the contact surface and the eccentric surface.

Hole boring to the outer tube 11 is machined, for example, in the following procedure. At first, hole boring of the through hole 20 is carried out across the entirety of the outer tube 11. Then, as shown in FIG. 3A, the first fitting hole 45 is machined by the depth of L1+L2+L3 with the inner diameter of the rotation radius Rp. Then, the second fitting hole 46 is machined by the depth of L1. Finally, as shown in FIGS. 3A, 3B and 4C, the eccentric hole having the radius Rq is machined by the depth L2 about the eccentric central axis "Q", wherein the eccentric central axis "Q" is shifted by the eccentric quantity "e" from the previous boring center position. As a result of this final boring, as shown in FIGS. 3A and 4C, the eccentric surface 52 continued to the contact surface 51 is formed along the length L2.

As shown in FIG. 4D, when the inner tube 15 is mounted in the outer tube 11, the bypass channel 53 is formed between the eccentric surface 52 of the outer tube 11 and the outer peripheral surface of the inner tube 15, and the bypass channel 53 is communicated with the communication holes 49.

FIG. 2A shows a state in which the five communication holes 49 are communicated with the bypass channel 53. In this state, the communication opening degree between the bypass channel 53 and the communication holes 49 is maximized, the bypass channel 53 and the shock absorbing chamber 28 are communicated with each other via all the communication holes 49, and the flow resistance of the liquid is minimized. FIG. 2A shows a state in which the communication hole 49 at the circumferential-direction center part is located at the circumferential-direction center part of the eccentric surface 52, wherein the thickness-direction dimension between the opening surfaces of all the communication holes 49 and the eccentric surface 52 becomes a maximum value.

FIG. 2B shows a state in which the inner tube 15 is rotated by 90 degrees in a counterclockwise direction from the state of FIG. 2A. In this state, the two communication holes 49 are closed by the contact surface 51, and the three communication holes 49 are communicated with the bypass channel 53 in the shown state. Therefore, the communication opening degree between the bypass channel 53 and the communication hole 49 is smaller than that of the state shown in FIG. 2A. The thickness-direction dimension between opening surfaces of the communicated three communication holes 49 and the eccentric surface 52 is smaller than that of the case shown in FIG. 2A.

FIG. 2C shows a state in which the inner tube 15 is rotated by 180 degrees from the state of FIG. 2A. In this state, all the communication holes 49 are closed by the contact surface 51, and the liquid does not flow through the communication holes 49 almost at all. In this manner, when the inner tube 15 is rotated, the communication opening degree of the bypass channel 53 and each of the plurality of communication holes 49 is changed in a non-step manner from a completely-open position to a completely-closed position.

Next, a shock absorbing operation by the shock absorber 10 will be explained. In a state where the moving member does not abuts on the projecting end 14a of the piston rod 14, the spring force of the compression coil spring 33 causes the piston rod 14 to be at a projected limit position. When the moving member (not shown) collides with the piston rod 14 in this state, impact force in the backward direction, in other words, the direction in which the projecting end 14a is moved into the outer tube 11 is applied to the piston rod 14.

As a result, the annular piston 27 is moved backward in the liquid accommodating chamber 16, the liquid in the shock absorbing chamber 28 flows toward the accumulator chamber 29 through the gap between the outer peripheral surface of the annular piston 27 and the inner peripheral surface of the inner tube 15, flows out to the bypass channel 53 via the communication holes 49, and flows to the accumulator chamber 29. The accumulator member 43 is contracted by the liquid flowed into the accumulator chamber 29. At this point, flow resistance is applied to the liquid which flows from the shock absorbing chamber 28 to the accumulator chamber 29; therefore, the kinetic energy of the moving member is damped. By virtue of this, the impact force applied to the moving member is reduced. When the moving member abuts on the end plate 41, the movement of the moving member is stopped. At the point when the moving member abuts on the end plate 41, the impact force applied to the moving member is reduced.

On the other hand, when the moving member is separated from the piston rod 14, the piston rod 14 is driven in the projecting direction by the compression coil spring 33. At this point, the liquid supplied from the accumulator member 43 flows into the shock absorbing chamber 28 from the gap 30 between the annular piston 27 and the inner peripheral surface of the inner tube 15, from the communication holes 49, and, in addition to that, also from the gap 34 and the groove 35. As a result, the piston rod 14 is quickly driven toward the projected limit position.

When the rotation angle of the inner tube 15 is changed with respect to the outer tube 11, the communication opening degree of the communication holes 49 can be changed in a non-step manner. In order to adjust the rotation angle of the inner tube 15, the fixing screw member (not shown) provided at the adjusting knob 25 is loosened, and the inner tube 15 is then rotated. At this point, the adjusting knob 25 is provided so as to project from the base end of the outer tube 11. Therefore, a rotating operation of the inner tube 15 can be easily carried out in the base end side of the outer tube 11. Moreover, since the rotation angle of the inner tube 15 can be adjusted by operating the adjusting knob 25 in the base end side of the outer tube 11, in a state in which the shock absorber 10 is installed on a member, the communication opening degree of the communication holes 49 can be changed by the adjusting knob 25 while an operator collides the moving member with the piston rod 14 and checks the impact force of the moving member.

In the above-described shock absorber 10, since the damping amount of the shock absorber 10 is adjusted by only two parts, i.e., the outer tube 11 and the inner tube 15, the shock absorber 10 can be reduced in the number of the constituent parts, and reduced in dimension in the axial and radial directions. Therefore, the shock absorber 10 can be reduced in size. Since the first fitting hole 45 for supporting the rotation of the inner tube 15 extends in the axial direction, the axis of the inner tube 15 is prevented from being deflected. Furthermore, the outer peripheral surface of the inner tube 15 is fitted in the fitting hole 45, and they can be easily improved in machining accuracy. Therefore, even when the inner tube 15 is rotated, the axis of the inner tube 15 is prevented from being deflected, and the damping amount of the shock absorber 10 can be adjusted with accuracy from a completely-open position to a completely-closed position of the communication holes 49.

The present invention is not limited to the above-described embodiment and can be variously modified within a range not departing from the gist thereof. For example, the rotation radius Rp and the radius Rq may be the same, in other words, ΔR=0 may be used. The usage mode of the shock absorber 10 is not limited to the case in which the moving member is caused to collide with the piston rod 14 to cause the end plate 41 to abut on the moving member. The shock absorber 10 can be applied also to a case in which a vibrating member is attached to the distal end of the piston rod 14 to absorb the impact of the vibrating member.

EXPLANATION OF REFERENCES

11 outer tube
14 piston rod
15 inner tube
16 liquid accommodating chamber
19 rotative operating part
25 adjusting knob
27 annular piston
28 shock absorbing chamber
29 accumulator chamber
31 flange
32 spring receiving member
33 compression coil spring
36 rod cover
43 accumulator member
45, 46 fitting hole
48 flow-rate adjusting hole
49 communication holes
51 contact surface
52 eccentric surface
53 bypass channel
P rotation central axis
Q eccentric central axis

What is claimed is:

1. A shock absorber comprising:
an outer tube on in which a piston rod is mounted, and in which the piston rod is reciprocable in an axial direction, the piston rod having a projecting end projecting from a distal end of the outer tube;
an inner tube rotatably mounted in the outer tube, the inner tube and the outer tube collectively forming a liquid accommodating chamber to which liquid is injected, the inner tube is provided with a plurality of communication holes arranged at intervals in a circumferential direction thereof, and formed so as to penetrate through the inner tube in a radial direction thereof;
a rotative operating part provided at connected with the inner tube, the rotative operating part projecting from a base end of the outer tube; and
a spring member disposed in the inner tube, the spring member applying a spring force to the piston rod in a projecting direction of the piston rod;
wherein
the inner surface of the outer tube has a contact surface and an eccentric surface having a curvature axis which is distant from a curvature axis of the contact surface,
the curvature axis of the contact surface is aligned with a rotation central axis of the inner tube, and the contact surface of the outer tube is in contact with an outer peripheral surface of the inner tube,
the eccentric surface of the outer tube and the outer peripheral surface of the inner tube collectively form a bypass channel which communicates with the communication holes, the bypass channel having a thickness reduced in a circumferential direction from the center part toward both ends thereof, and
a communication opening degree of the bypass channel is changeable in a stepless manner and the communication hole is configured to be changed by rotating the inner tube and the communication holes with respect to the outer tube between a fully-opened state having a maximum value of the communication opening degree, and a closed state having a minimum value of the communication opening degree.

2. The shock absorber according to claim 1, further comprising an annular piston provided at a base end of the piston rod, the annular piston separating liquid accommodating chamber into a shock absorbing chamber and an accumulator chamber, the shock absorbing chamber being disposed on a base end side of the inner tube and having the spring member stored therein, and the accumulator chamber being disposed on a distal end side of the inner tube.

3. The shock absorber according to claim 1, wherein
the radius of the eccentric surface is larger than a rotation radius of the outer peripheral surface of the inner tube.

4. The shock absorber according to claim 3, wherein
an eccentric amount of an eccentric central axis of the eccentric surface and the rotation central axis of the outer peripheral surface of the inner tube is larger than the difference between the radius and the rotation radius.

5. The shock absorber according to claim 1, wherein
a first fitting hole rotatably supporting the inner tube is provided at the base end of the outer tube so as to be contiguous with the flow-rate adjusting hole; and
a seal member sealing a part between the fitting hole and the inner tube is provided at the inner tube.

6. The shock absorber according to claim 1, wherein
the outer tube has a distal end provided with a rod cover through which the piston rod extends; and
the rod cover is provided with an accumulator member forming an accumulator chamber which is contracted by the liquid flowing from a shock absorbing chamber formed by the piston within the inner tube to the accumulator chamber upon a backward movement of the piston rod, and which supplies the liquid from the accumulator chamber to the shock absorbing chamber upon projecting movement of the piston rod.

* * * * *

UNITED STATES PATENT AND TRADEMARK OFFICE
CERTIFICATE OF CORRECTION

PATENT NO. : 9,551,395 B2
APPLICATION NO. : 14/739527
DATED : January 24, 2017
INVENTOR(S) : Shunsuke Fujihara It is certified that error appears in the above-identified patent and that said Letters Patent is hereby corrected as shown below:

In the Claims

Claim 1 Line 2, "an outer tube on in which a piston rod is mounted" should be changed to --an outer tube in which a piston rod is mounted--.

Signed and Sealed this
First Day of August, 2017

Joseph Matal
*Performing the Functions and Duties of the*
*Under Secretary of Commerce for Intellectual Property and*
*Director of the United States Patent and Trademark Office*